United States Patent
Tredoux et al.

(10) Patent No.: US 9,654,904 B2
(45) Date of Patent: May 16, 2017

(54) SYSTEM AND METHOD FOR FLEXIBLY PAIRING DEVICES USING ADAPTIVE VARIABLE THRESHOLDING

(71) Applicant: Xerox Corporation, Norwalk, CT (US)

(72) Inventors: Gavan Tredoux, Penfield, NY (US);
Premkumar Rajendran, Fairport, NY (US); Peter Zehler, Penfield, NY (US);
Michael Wang, Macedon, NY (US);
Francis Tse, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 14/625,792

(22) Filed: Feb. 19, 2015

(65) Prior Publication Data

US 2016/0249158 A1 Aug. 25, 2016

(51) Int. Cl.
*H04W 4/00* (2009.01)
*H04L 12/26* (2006.01)
*H04W 8/00* (2009.01)
*H04W 48/16* (2009.01)
*H04W 48/14* (2009.01)

(52) U.S. Cl.
CPC ............ *H04W 4/008* (2013.01); *H04L 43/16* (2013.01); *H04W 8/005* (2013.01); *H04W 48/16* (2013.01); *H04W 48/14* (2013.01)

(58) Field of Classification Search
CPC ........ H04W 4/008; H04W 8/005; H04L 43/16
USPC ....................................................... 455/41.2
See application file for complete search history.

(56) References Cited

U.S. PATENT DOCUMENTS

| | | | | |
|---|---|---|---|---|
| 5,673,252 A * | 9/1997 | Johnson | ................. | G01D 4/004 370/346 |
| 5,687,364 A * | 11/1997 | Saund | ................. | G06F 17/3071 704/5 |
| 5,752,229 A * | 5/1998 | Duttweiler | ............... | H04B 3/23 370/291 |
| 5,963,130 A * | 10/1999 | Schlager | ............ | G08B 21/0453 340/501 |
| 6,014,565 A * | 1/2000 | Bonta | .................... | H04W 16/18 455/437 |
| 6,038,444 A * | 3/2000 | Schipper | ............ | H04B 7/18541 455/421 |
| 6,216,009 B1 * | 4/2001 | Barnett | ................ | H04B 17/382 455/453 |
| 6,674,738 B1 * | 1/2004 | Yildiz | .................. | H04L 1/0045 370/338 |
| 6,684,174 B2 * | 1/2004 | Clark | ..................... | A63B 57/00 702/138 |

(Continued)

*Primary Examiner* — Hai V Nguyen
(74) *Attorney, Agent, or Firm* — Kevin Soules; Kermit D. Lopez; Luis M. Ortiz

(57) ABSTRACT

A method and system for pairing devices comprises transmitting a plurality of communication signals from each of a plurality of devices and setting an initial threshold vector of signal strengths as a current threshold vector of signal strengths for at least one target device selected from among the plurality of devices. The embodiment includes pairing at least one client device with the at least one target device when a measured vector of signal strengths exceeds the current threshold vector of signal strengths and adjusting the current threshold vector of signal strengths according to the pairing between the client device and the target device, thereby adaptively adjusting the current threshold vector of signal strengths.

20 Claims, 9 Drawing Sheets

(56) References Cited

U.S. PATENT DOCUMENTS

| | | | | |
|---|---|---|---|---|
| 6,978,151 B2* | 12/2005 | Choi | H04W 52/10 | 370/252 |
| 6,983,167 B2* | 1/2006 | Adachi | H01Q 1/246 | 370/322 |
| 7,031,336 B2* | 4/2006 | Scherzer | H04W 28/18 | 370/338 |
| 7,031,725 B2* | 4/2006 | Rorabaugh | G01S 5/0289 | 455/404.2 |
| 7,082,305 B2* | 7/2006 | Willars | H04B 7/18541 | 342/357.4 |
| 7,161,951 B1* | 1/2007 | Sherman | H04W 74/008 | 370/447 |
| 7,202,816 B2* | 4/2007 | Krumm | G01C 21/00 | 342/451 |
| 7,319,877 B2* | 1/2008 | Krumm | G01S 5/0252 | 342/387 |
| 7,421,248 B1* | 9/2008 | Laux | H04L 1/0002 | 370/352 |
| 7,433,696 B2* | 10/2008 | Dietrich | G01S 5/02 | 342/357.43 |
| 7,457,602 B2* | 11/2008 | Ghassemzadeh | H04B 7/0857 | 375/299 |
| 7,496,546 B2* | 2/2009 | Hoya | G06N 3/04 | 706/15 |
| 7,567,822 B2* | 7/2009 | Hart | H04W 16/18 | 370/310 |
| 7,738,881 B2* | 6/2010 | Krumm | G01C 21/28 | 340/539.21 |
| 7,835,749 B1* | 11/2010 | Hart | G01S 5/0252 | 342/450 |
| 7,885,287 B2* | 2/2011 | Bachrach | H04W 74/0816 | 370/447 |
| 7,990,314 B2* | 8/2011 | Liao | G01S 5/0257 | 342/357.29 |
| 8,238,937 B2* | 8/2012 | Ha | G01S 5/0289 | 455/456.1 |
| 8,340,580 B1* | 12/2012 | Epstein | H04B 1/1027 | 455/114.2 |
| 8,345,163 B2* | 1/2013 | Fujiyama | H04N 5/144 | 348/607 |
| 8,411,585 B2* | 4/2013 | Liu | H04W 72/082 | 370/252 |
| 8,446,149 B2* | 5/2013 | Heberlein | G01R 33/5611 | 324/307 |
| 8,463,021 B2* | 6/2013 | Pal | G06T 17/00 | 382/154 |
| 8,594,003 B2* | 11/2013 | Han | G01S 5/0284 | 370/310 |
| 8,676,909 B2* | 3/2014 | Guyot | H04L 12/585 | 705/319 |
| 8,699,424 B2* | 4/2014 | Chandra | H04W 28/18 | 370/328 |
| 8,700,062 B1* | 4/2014 | Olson | G01S 5/145 | 455/456.1 |
| 8,744,352 B2* | 6/2014 | Pochop, Jr. | H04W 16/18 | 455/41.1 |
| 8,792,057 B2* | 7/2014 | Stopler | H04N 5/38 | 348/723 |
| 8,933,841 B2* | 1/2015 | Valaee | H04W 64/00 | 342/357.31 |
| 8,948,809 B2* | 2/2015 | Oka | H04W 48/18 | 455/524 |
| 8,983,490 B2* | 3/2015 | Un | H04W 64/00 | 455/456.1 |
| 9,042,907 B2* | 5/2015 | Oka | H04W 4/02 | 455/456.1 |
| 9,091,746 B2* | 7/2015 | Fischer | G01S 5/0242 | |
| 9,154,914 B2* | 10/2015 | Haverinen | H04W 4/04 | |
| 9,179,244 B2* | 11/2015 | Linde | H04W 4/021 | |
| 9,194,934 B2* | 11/2015 | Oka | G01S 5/0252 | |
| 9,253,601 B2* | 2/2016 | Haverinen | H04W 4/04 | |
| 9,491,678 B2* | 11/2016 | Cui | H04W 36/22 | |
| 2004/0033808 A1* | 2/2004 | Rorabaugh | G01S 5/0289 | 455/456.1 |
| 2005/0020210 A1* | 1/2005 | Krumm | G01C 21/00 | 455/41.2 |
| 2005/0261004 A1* | 11/2005 | Dietrich | G01S 5/02 | 455/456.2 |
| 2006/0075131 A1* | 4/2006 | Douglas | G01S 5/0252 | 709/230 |
| 2007/0013547 A1* | 1/2007 | Boaz | G01D 4/002 | 340/870.02 |
| 2007/0082677 A1* | 4/2007 | Donald Hart | H04W 16/18 | 455/456.1 |
| 2008/0200181 A1* | 8/2008 | Zill | G01S 5/02 | 455/456.1 |
| 2008/0285530 A1* | 11/2008 | Dietrich | G01S 5/02 | 370/338 |
| 2008/0294217 A1* | 11/2008 | Lian | A61N 1/3712 | 607/28 |
| 2009/0191878 A1* | 7/2009 | Hedqvist | H04W 36/32 | 455/441 |
| 2010/0008316 A1* | 1/2010 | Liu | H04W 72/082 | 370/329 |
| 2010/0022263 A1* | 1/2010 | Stamoulis | H04W 24/02 | 455/501 |
| 2010/0264923 A1* | 10/2010 | Heberlein | G01R 33/5611 | 324/309 |
| 2011/0274094 A1* | 11/2011 | Jovicic | G01S 5/0278 | 370/338 |
| 2011/0306384 A1* | 12/2011 | Wei | H04B 7/0617 | 455/522 |
| 2012/0000105 A1* | 1/2012 | Pieracci | G09F 1/02 | 40/584 |
| 2012/0033137 A1* | 2/2012 | Fujiyama | H04N 5/144 | 348/607 |
| 2012/0070068 A1* | 3/2012 | Pal | G06T 17/00 | 382/154 |
| 2012/0078678 A1* | 3/2012 | Pradhan | G06Q 10/0633 | 705/7.27 |
| 2012/0102130 A1* | 4/2012 | Guyot | H04L 51/12 | 709/206 |
| 2012/0105729 A1* | 5/2012 | Stopler | H04N 5/38 | 348/723 |
| 2012/0106357 A1* | 5/2012 | Zummo | H04L 41/145 | 370/242 |
| 2012/0109600 A1* | 5/2012 | Saeed | G06F 17/10 | 703/2 |
| 2012/0165012 A1* | 6/2012 | Fischer | G01S 5/0242 | 455/435.1 |
| 2012/0214483 A1* | 8/2012 | Tong | H04W 36/0022 | 455/434 |
| 2012/0289248 A1* | 11/2012 | Stamoulis | H04W 24/02 | 455/456.1 |
| 2012/0290720 A1* | 11/2012 | Stamoulis | H04W 24/02 | 709/224 |
| 2013/0051382 A1* | 2/2013 | Derham | H04B 7/043 | 370/345 |
| 2013/0165144 A1* | 6/2013 | Ziskind | H04W 4/02 | 455/456.1 |
| 2013/0234894 A1* | 9/2013 | Oka | G01S 5/0252 | 342/451 |
| 2013/0237242 A1* | 9/2013 | Oka | H04W 4/02 | 455/456.1 |
| 2013/0237278 A1* | 9/2013 | Oka | H04W 48/18 | 455/524 |
| 2013/0238681 A1* | 9/2013 | Oka | G06F 7/58 | 708/250 |
| 2013/0260781 A1* | 10/2013 | Un | H04W 64/00 | 455/456.1 |
| 2014/0022918 A1* | 1/2014 | Guo | H04W 48/20 | 370/252 |
| 2014/0036787 A1* | 2/2014 | Ganu | H04W 16/10 | 370/329 |
| 2014/0064116 A1* | 3/2014 | Linde | H04W 4/021 | 370/252 |
| 2014/0210635 A1* | 7/2014 | Majava | H01Q 3/34 | 340/870.01 |

(56) References Cited

U.S. PATENT DOCUMENTS

| | | | | |
|---|---|---|---|---|
| 2014/0226503 A1* | 8/2014 | Cooper | | H04W 4/043 370/252 |
| 2015/0081474 A1* | 3/2015 | Kostka | | G06Q 30/0633 705/26.8 |
| 2015/0196769 A1* | 7/2015 | Stahmann | | A61B 5/0028 607/32 |
| 2015/0200740 A1* | 7/2015 | Yi | | H04J 11/0053 370/329 |
| 2015/0215762 A1* | 7/2015 | Edge | | H04W 8/005 370/338 |
| 2015/0220995 A1* | 8/2015 | Guyot | | G06Q 50/01 705/14.66 |
| 2015/0271432 A1* | 9/2015 | Muth | | H04N 5/44 348/552 |
| 2015/0278350 A1* | 10/2015 | Nice | | G06F 17/30699 707/754 |
| 2015/0318874 A1* | 11/2015 | Donaldson | | H04B 11/00 367/135 |
| 2015/0327060 A1* | 11/2015 | Gilson | | H04L 67/16 726/7 |
| 2015/0334504 A1* | 11/2015 | Donaldson | | H04S 7/303 381/307 |
| 2015/0379576 A1* | 12/2015 | Otis | | G06Q 30/0261 705/14.53 |
| 2015/0382153 A1* | 12/2015 | Otis | | H04W 4/043 455/456.2 |
| 2016/0007184 A1* | 1/2016 | Kulikov | | G01S 5/0252 455/41.2 |
| 2016/0066201 A1* | 3/2016 | Kerpez | | H04W 24/02 370/252 |
| 2016/0094934 A1* | 3/2016 | Yang | | H04W 4/008 455/41.2 |
| 2016/0119330 A1* | 4/2016 | L'Heureux | | H04L 63/02 726/7 |
| 2016/0132601 A1* | 5/2016 | Nice | | G06F 17/30867 707/754 |

* cited by examiner

SYSTEM AND METHOD FOR FLEXIBLY PAIRING DEVICES USING ADAPTIVE VARIABLE THRESHOLDING

FIELD OF THE INVENTION

Embodiments are generally related to the field of computing. Embodiments are also related to methods and systems for pairing computing devices. Embodiments are further related to methods and systems for flexibly pairing devices via wireless communications protocols using adaptive variable thresholding.

BACKGROUND

Applications that require device pairing have become increasingly common. Device pairing generally describes the process wherein one or more devices identify other devices and then establish communication with the other devices. It is common for different mechanisms to be used for the initial identification and the subsequent communication. Device pairing is generally related to computing devices such as computers, hand-held devices, mobile devices, smartphones, multi-function devices, and the like. It is not uncommon for pairing to occur between different types of devices.

Commonly deployed pairing solutions include the standard Near Field Communications (NFC) protocol. NFC is a form of short-range wireless communication. There is no explicit industry-defined distance necessary for NFC. However, for practical purposes it is roughly one quarter of an associated wavelength. NFC can also be characterized by the ability to work with either an electric field, or a magnetic field, but not an electromagnetic field.

While NFC protocols are useful, many mobile devices do not support NFC. A need exists for non-NFC based solution for scenarios in which some of the devices involved do not support NFC. There is also a need for systems and methods that offer greater flexibility than standard NFC.

SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is, therefore, one aspect of the disclosed embodiments to provide a method and system for pairing devices.

It is another aspect of the disclosed embodiments to provide a method and system for pairing mobile devices with rendering devices.

It is yet another aspect of the disclosed embodiments to provide an enhanced method and system for pairing devices using variable thresholding.

The aforementioned aspects and other objectives and advantages can now be achieved as described herein. A method and system for pairing devices comprises transmitting a plurality of communication signals from each of a plurality of devices and setting an initial threshold vector of signal strengths as a current threshold vector of signal strengths for at least one target device selected from among the plurality of devices. The embodiment includes pairing at least one client device with at least one target device when a measured vector of signal strengths exceeds the current threshold vector of signal strengths; and adjusting the current threshold vector of signal strengths according to the pairing between the client device and the target device, thereby adaptively adjusting the current threshold vector of signal strengths.

BRIEF DESCRIPTION OF THE DRAWINGS

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

DETAILED DESCRIPTION

The particular values and configurations discussed in these non-limiting examples can be varied and are cited merely to illustrate at least one embodiment and are not intended to limit the scope thereof.

Figure 1:
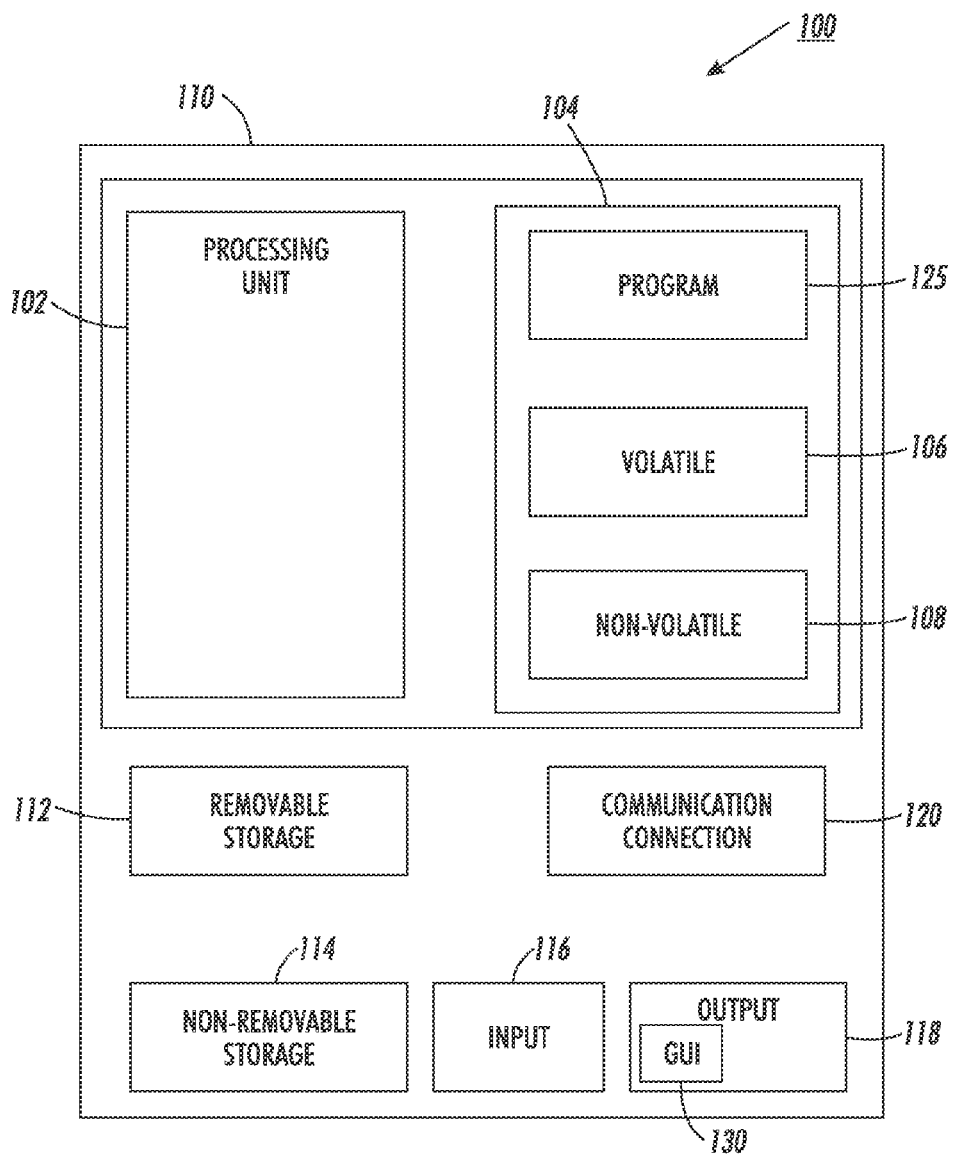
FIG. 1 depicts a block diagram of a computer system which is implemented in accordance with the disclosed embodiments.
Figure 2:
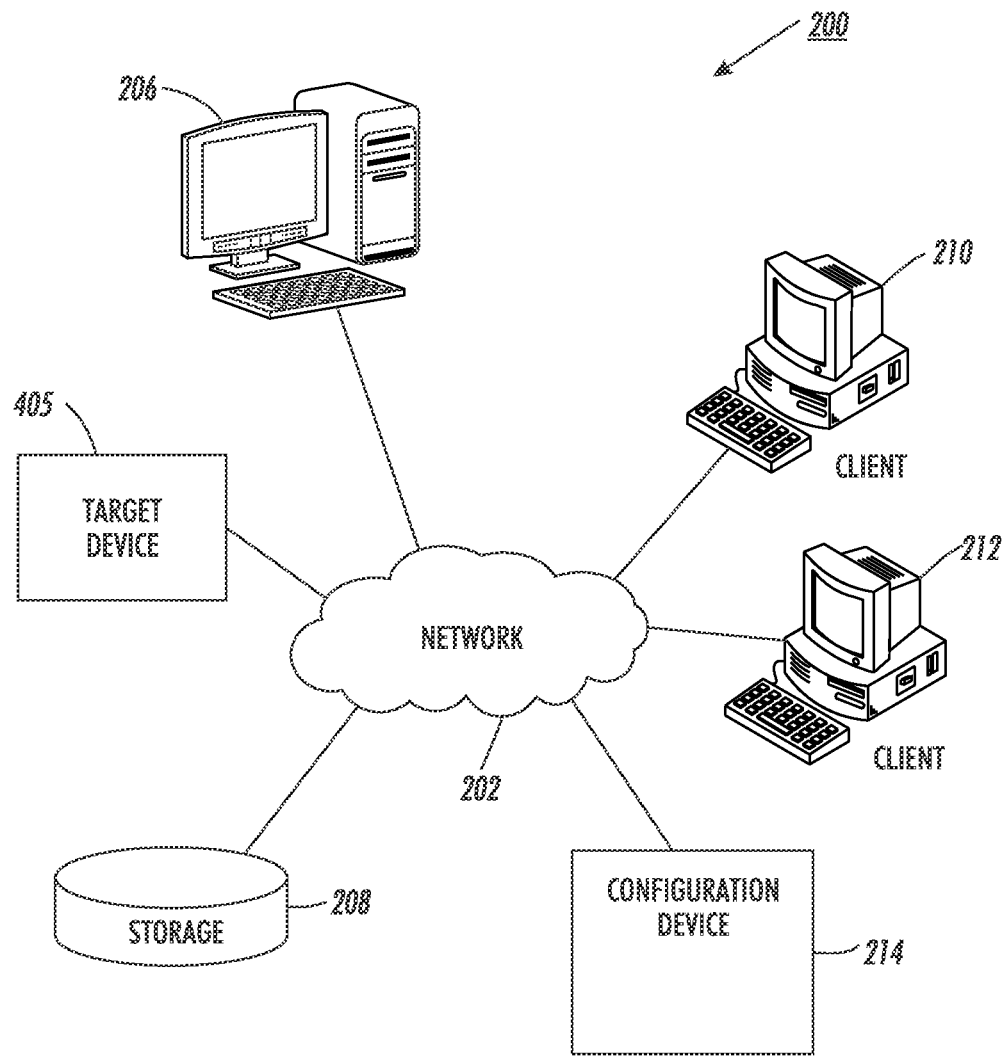
FIG. 2 depicts a graphical representation of a network of data-processing devices in which aspects of the present invention may be implemented.
Figure 3:
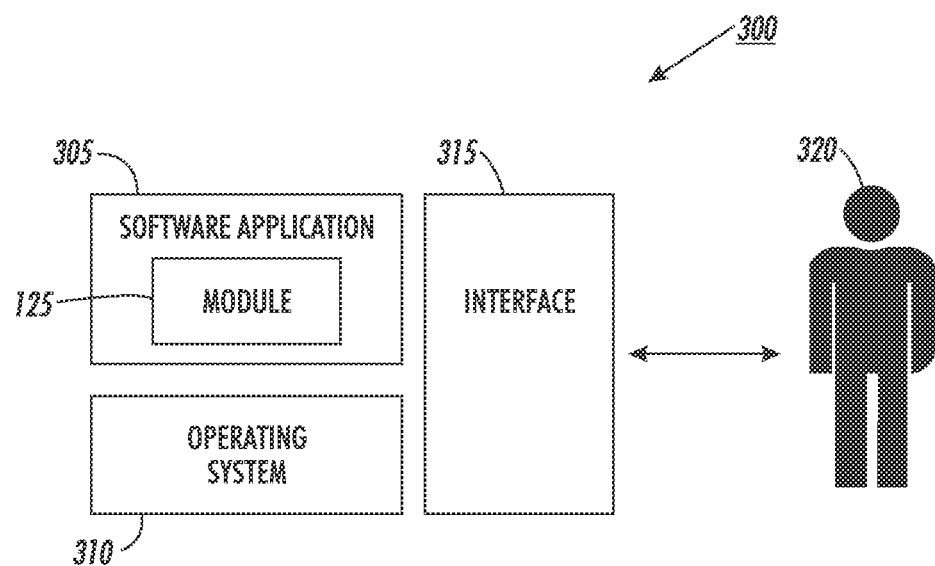
FIG. 3 depicts a computer software system for directing the operation of the data-processing system depicted in FIG. 1, in accordance with an embodiment of the invention.

FIGS. 1-3 are provided as exemplary diagrams of data-processing environments in which embodiments of the present invention may be implemented. It should be appreciated that FIGS. 1-3 are only exemplary and are not intended to assert or imply any limitation with regard to the environments in which aspects or embodiments of the disclosed embodiments may be implemented. Many modifications to the depicted environments may be made without departing from the spirit and scope of the disclosed embodiments.

A block diagram of a computer system 100 that executes programming for implementing parts of the methods and systems disclosed herein is shown in FIG. 1. A computing device in the form of a computer 110 configured to interface with sensors, peripheral devices, and other elements disclosed herein may include a processing unit 102, memory 104, removable storage 112, and non-removable storage 114. Memory 104 may include volatile memory 106 and non-volatile memory 108. Computer 110 may include or have access to a computing environment that includes a variety of transitory and non-transitory computer-readable media such as volatile memory 106 and non-volatile memory 108, removable storage 112 and non-removable storage 114. Computer storage includes, for example, random access memory (RAM), read only memory (ROM), erasable programmable read-only memory (EPROM), electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage, or other magnetic storage devices, or any other medium capable of storing computer-readable instructions, as well as data including image data.

Computer 110 may include or have access to a computing environment that includes input 116, output 118, and a communication connection 120. The computer may operate in a networked environment using a communication connection 120 to connect to one or more remote computers, hand-held devices, printers, copiers, faxes, multi-function devices (MFDs), mobile devices, mobile phones, Smartphones, or other such devices. The remote computer may also include a personal computer (PC), server, router, network PC, a peer device or other common network node, or the like. The communication connection may include a Local Area Network (LAN), a Wide Area Network (WAN), Bluetooth connection, a Bluetooth low energy connection, or other networks. This functionality is described in more fully in the description associated with FIG. 2 below.

Output 118 is most commonly provided as a computer monitor, but may include any output device. Output 118 may also include a data collection apparatus associated with computer system 100. In addition, input 116, which commonly includes a computer keyboard and/or pointing device such as a computer mouse, computer track pad, or the like, allows a user to select and instruct computer system 100. A user interface can be provided using output 118 and input 116. Output 118 may function as a display for displaying data and information for a user and for interactively displaying a graphical user interface (GUI) 130.

Note that the term "GUI" generally refers to a type of environment that represents programs, files, options, and so forth by means of graphically displayed icons, menus, and dialog boxes on a computer monitor screen. A user can interact with the GUI to select and activate such options by directly touching the screen and/or pointing and clicking with a user input device 116, for example, a pointing device such as a mouse, and/or with a keyboard. A particular item can function in the same manner to the user in all applications because the GUI provides standard software routines (e.g., module 125) to handle these elements and report the user's actions. The GUI can further be used to display the electronic service image frames as discussed below.

Computer-readable instructions, for example, program module 125, which can be representative of other modules described herein, are stored on a computer-readable medium and are executable by the processing unit 102 of computer 110. Program module 125 may include a computer application. A hard drive, CD-ROM, RAM, Flash Memory, and a USB drive are just some examples of articles including a computer-readable medium.

FIG. 2 depicts a graphical representation of a network of data-processing systems 200 in which aspects of the present invention may be implemented. Network data-processing system 200 is a network of computers or other devices such as mobile phones, smartphones, MFDs, and the like in which embodiments of the present invention may be implemented.

Note that the system 200 can be implemented in the context of a software module such as program module 125. The system 200 includes a network 202 in communication with one or more clients 210 and 212. Network 202 may also be in communication with one or more target devices 405, servers 206, storage 208, and configuration devices 214. Network 202 is a medium that can be used to provide communications links between various devices and computers connected together within a networked data processing system such as computer system 100. Network 202 may include connections such as wired communication links, wireless communication links or various types, and fiber optic cables. Network 202 can communicate with one or more servers 206, one or more external devices such as target 405 or configuration device 214, and a memory storage unit such as, for example, memory or database 208.

In the depicted example, target 405, server 206, and configuration device 214 connect to network 202 along with storage unit 208. In addition, clients 210 and 212 connect to network 202. Clients 210 and 212 may be, for example, personal computers or network computers, handheld devices, mobile devices, tablet devices, smartphones, personal digital assistants, etc. Computer system 100 depicted in FIG. 1 can be, for example, a client such as client 210 and/or 212.

Computer system 100 can also be implemented as a server such as server 206, depending upon design considerations. In the depicted example, server 206 provides data such as boot files, operating system images, applications, and application updates to clients 210 and 212, and/or to target device 204 and configuration device 214. Clients 210, 212, and target device 214 (or client devices 410 A-C) are clients to server 206 in this example. Network data-processing system 200 may include additional servers, clients, and other devices not shown. Specifically, clients may connect to any member of a network of servers, which provide equivalent content.

In the depicted example, network data-processing system 200 is the Internet with network 202 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, government, educational, and other computer systems that route data and messages. Of course, network data-processing system 200 may also be implemented as a number of different types of networks such as, for example, an intranet, a local area network (LAN), a wide area network (WAN), Near Field Communication (NFC), Bluetooth, or Bluetooth Low Energy (BLE). FIGS. 1 and 2 are intended as examples and not as architectural limitations for different embodiments of the present invention.

FIG. 3 illustrates a software system 300, which may be employed for directing the operation of the data-processing systems such as computer system 100 depicted in FIG. 1. Software application 305 may be stored in memory 104, on removable storage 112, or on non-removable storage 112 shown in FIG. 1, and generally includes and/or is associated with a kernel or operating system 310 and a shell or interface 315. One or more application programs, such as module(s) 125, may be "loaded" (i.e., transferred from removable storage 112 into the memory 104) for execution by the data-processing system 100. The data-processing system 100 can receive user commands and data through user interface 315, which can include input 116 and output 118, accessible by a user 320. These inputs may then be acted upon by the computer system 100 in accordance with instructions from operating system 310 and/or software application 305 and any software module(s) 125 thereof.

Generally, program modules (e.g., module 125) can include, but are not limited to, routines, subroutines, software applications, programs, objects, components, data structures, etc., that perform particular tasks or implement particular abstract data types and instructions. Moreover, those skilled in the art will appreciate that the disclosed method and system may be practiced with other computer system configurations such as, for example, hand-held devices, mobile phones, smartphones, tablet devices, multi-processor systems, printers, copiers, fax machines, multi-function devices, data networks, microprocessor-based or programmable consumer electronics, networked personal computers, minicomputers, mainframe computers, servers, and the like.

Note that the term module, as utilized herein, may refer to a collection of routines and data structures that perform a particular task or implements a particular abstract data type. Modules may be composed of two parts: an interface, which lists the constants, data types, variable, and routines that can be accessed by other modules or routines; and an implementation, which is typically private (accessible only to that module) and includes source code that actually implements the routines in the module. The term module may also simply refer to an application such as a computer program designed to assist in the performance of a specific task such as word processing, accounting, inventory management, etc., or a hardware component designed to equivalently assist in the performance of a task.

The interface 315 (e.g., a graphical user interface 130) can serve to display results, whereupon a user 320 may supply additional inputs or terminate a particular session. In some embodiments, operating system 310 and GUI 130 can be implemented in the context of a "windows" system. It can be appreciated, of course, that other types of systems are possible. For example, rather than a traditional "windows" system, other operation systems such as a real time operating system (RTOS), more commonly employed in wireless systems, may also be employed with respect to operating system 310 and interface 315. The software application 305 can include, for example, module(s) 125, which can include instructions for carrying out steps or logical operations such as those shown and described herein.

The following description is presented with respect to embodiments of the present invention, which can be embodied in the context of or require the use of a data-processing system, such as computer system 100, in conjunction with program module 125, data-processing system 200, and network 202 as depicted in FIGS. 1-3. The present invention, however, is not limited to any particular application or any particular environment. Instead, those skilled in the art will find that the system and method of the present invention may be advantageously applied to a variety of system and application software including database management systems, word processors, and the like. Moreover, the present invention may be embodied on a variety of different platforms including Windows, Macintosh, UNIX, LINUX, Android, and the like. Therefore, the descriptions of the exemplary embodiments, which follow, are for purposes of illustration and not considered a limitation.

The embodiments disclosed herein provide systems and methods for implementing pairing using wireless protocols such as Low Energy Bluetooth (BLE), or other such communications protocols, which can be deployed as either an integrated feature, or as an add-on capability via tags or dongles. Embodiments disclosed herein provide for deployment of pairing solutions in varying environments with markedly different wireless signal characteristics because the use of heterogeneous devices in different environments produces variability that must be addressed in order for systems to work with the desired degree of flexibility and reliability.

Figure 4:
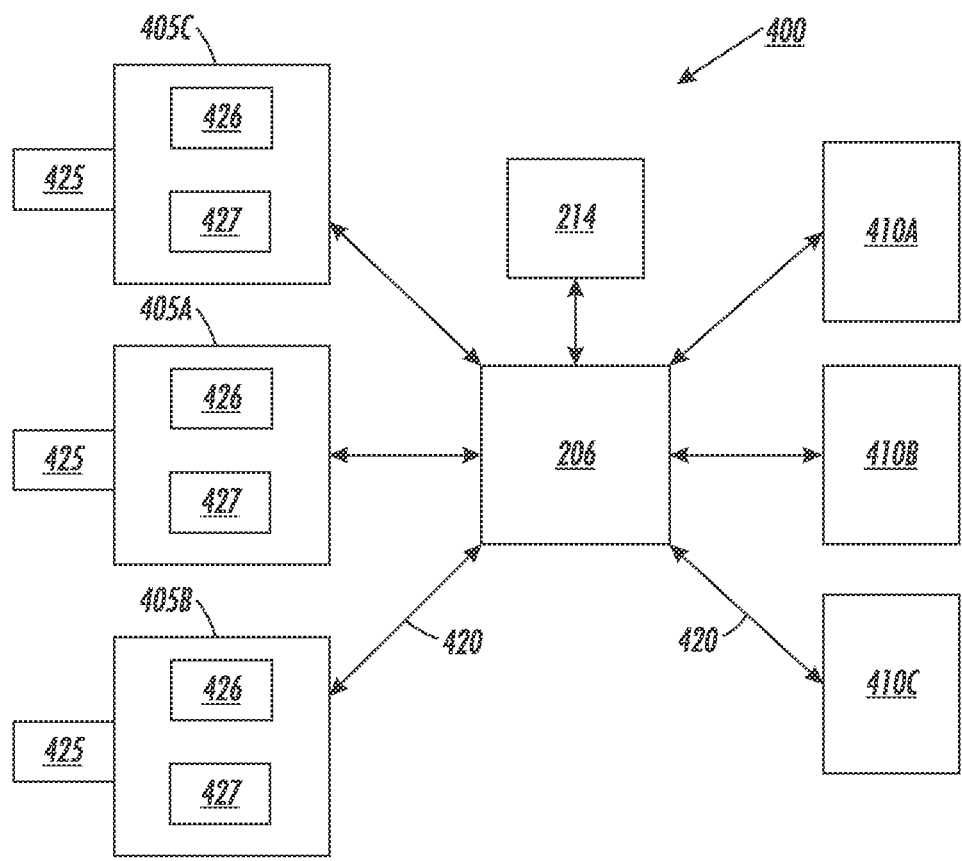
FIG. 4 depicts a system for pairing a target device and a client device, in accordance with an embodiment of the invention.

The system 400 may comprise one or a combination of the elements shown in FIG. 4. This can include one or more devices 405 A-C including one or more of devices 405 A-C being target devices, one or more client devices 410 A-C, a configuring device 214, and a server 206 that the client devices 410 A-C and target devices 405 A-C can access.

The target devices 405 A-C are most commonly embodied as MFDs, but can comprise other devices, and the client devices 410 A-C are most commonly mobile devices such as Smartphone, but can also comprise other devices. The server 206 may be located in the cloud or anywhere accessible to the target devices 405 A-C and client devices 410 A-C. Pairing between the target devices 405 A-C and client devices 410 A-C depends on detection and measurement of the strength of wireless signal 420 between the devices. It should be understood that the term "signal strength" as described herein may refer to the strength of a single signal or may refer to a vector comprising the combination of some or all the individual signals from multiple target devices 405. A vector of signal strengths may be used independently of or in addition to a single signal strength for purposes of setting thresholds and/or measuring signal strengths.

Figure 5:
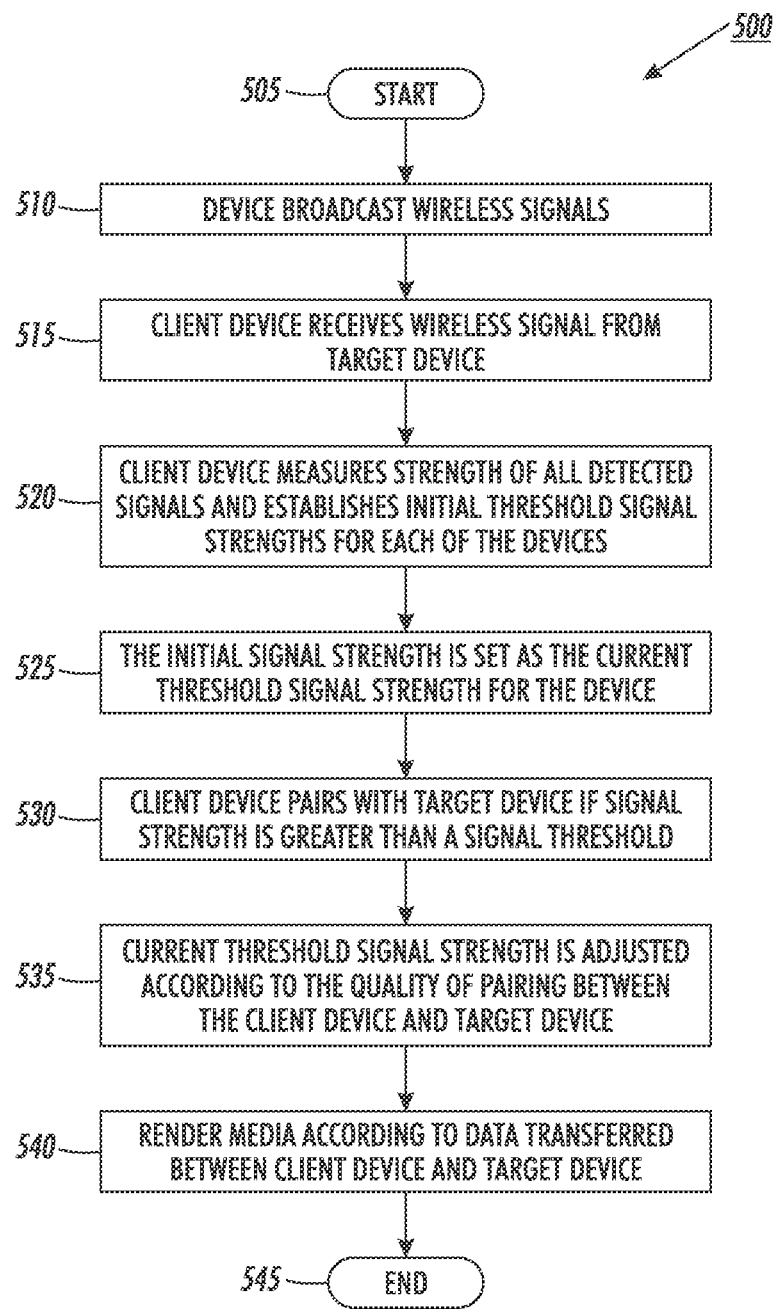
FIG. 5 depicts a flow chart of logical operational steps associated with a method for pairing a target device and a client device in accordance with an embodiment of the invention.

A method 500 for adaptively adjusting the threshold signal strength associated with wireless signal 420 necessary for pairing between target devices 405 A-C and client devices 410 A-C is illustrated in FIG. 5. The method begins at step 505. At step 510, at least one and perhaps many target devices 405 A-C broadcast a unique wireless signal 420, either via an add-on tag 425 or via built-in transmitters 426. It should be appreciated that any number of devices 405 may be equivalently included in method 500. The broadcast wireless signal 420 contains identifiers for the target device 405 that broadcast the signal, which can include a Globally Unique identifier (GUID), a human friendly identifier, and a locally assigned identifier.

Next at step 515, the client device 410 receives the wireless signal from the target device via receiving hardware that detects the wireless signal. The client device 410 may be configured to detect and receive multiple types of wireless signals. For example, the client device 410 may be capable of receiving broadcasts including BLE and 802.11a/b/c. Likewise, the target device may be capable of transmitting broadcasts via multiple broadcasting means such as BLE or 802.11a/b/c.

The client device 410 measures the strength of all the signals 420 it can detect, establishing initial threshold signal strengths for each of the devices as illustrated at step 520. Each of target devices 405 A-C is thus (wirelessly) "visible" to the client device 410. At step 525, the initially detected signal strength can be set as the current threshold signal strength for the given client device 410. The client device 410 then elects to "pair" with the target device 405 at step 530 if the signal strength the client device 410 is receiving is above a predetermined signal threshold.

Step 535 illustrates that the current threshold signal strength can be adjusted according to the pairing that occurs between the present client device and target device. This can be repeated for each new pairing that occurs in order to dynamically adjust the pairing threshold. Optionally at step 540, the data transferred between the client device 410 and the target device 405 during their pairing can be rendered as media. The method then ends at step 545.

The physical proximity of the target device 405 to the client device 410 will be associated with the signal strength threshold. When the client device 410 is further away from the target device 405, the signal strength decreases. At a sufficient distance, the signal strength will drop below the threshold. Similarly, when the client device 410 is nearer to the target device 405, the signal strength increases.

Figure 4A:
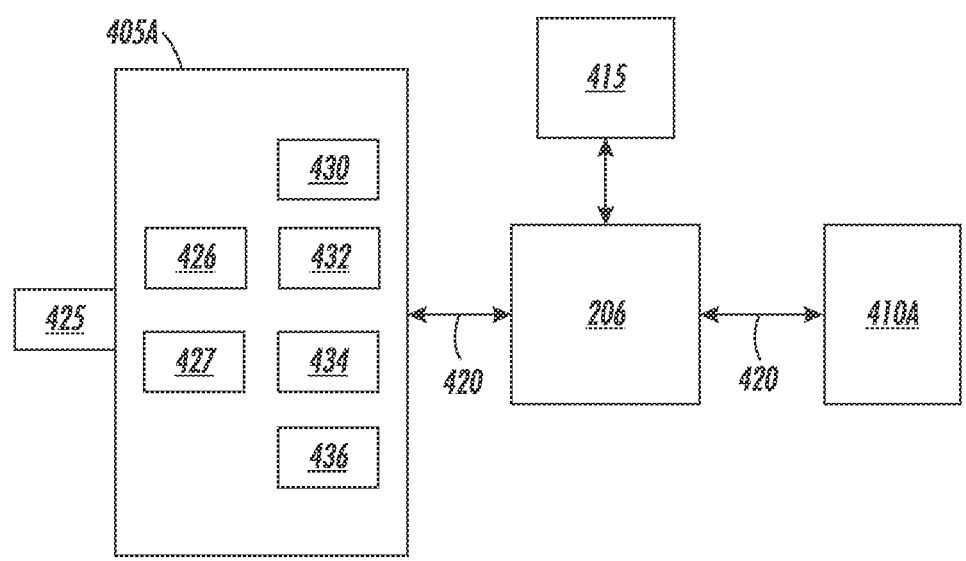
FIG. 4A depicts another embodiment of a system for pairing a target device and a client device.

A system for accomplishing the steps described herein may include a number of modules. The term module may refer to hardware or software modules associated with embodiments of the invention. FIG. 4A illustrates a number of modules which may be used to accomplish, for example, the steps illustrated in FIGS. 5 and 6. In FIG. 4A, target device 405A can include a communication module 430 for transmitting a communication signal from device 405A. A threshold setting module 432 can be configured to establish an initial threshold signal strength for the device 405A and set the initial threshold signal strength as the current threshold signal strength for the device 405. A pairing module 434 can be configured to pair the device to at least one client when the measured signal strength exceeds the current threshold signal strength. The threshold adjusting module 436 is configured to adjust the current threshold signal strength according to the pairing between the client device and the target device.

It should be appreciated that the signal strength, and therefore, the threshold may vary according to the target device 405 and client device 410 being used. For example, in one embodiment, the client devices 410 A-C are Smartphones. Smartphones vary in their ability to detect signals, depending on their form factor and hardware. Likewise, the target device 405 may vary in form factor and the position of the transmitting hardware (such as tag 425 or internal transmitter 426) both of which may affect the signal strength that the client device 410 actually detects at a given physical proximity to the target device 405. Moreover, the location (i.e., the room, building, etc.) in which the equipment is deployed may degrade signal strength.

Figure 6:
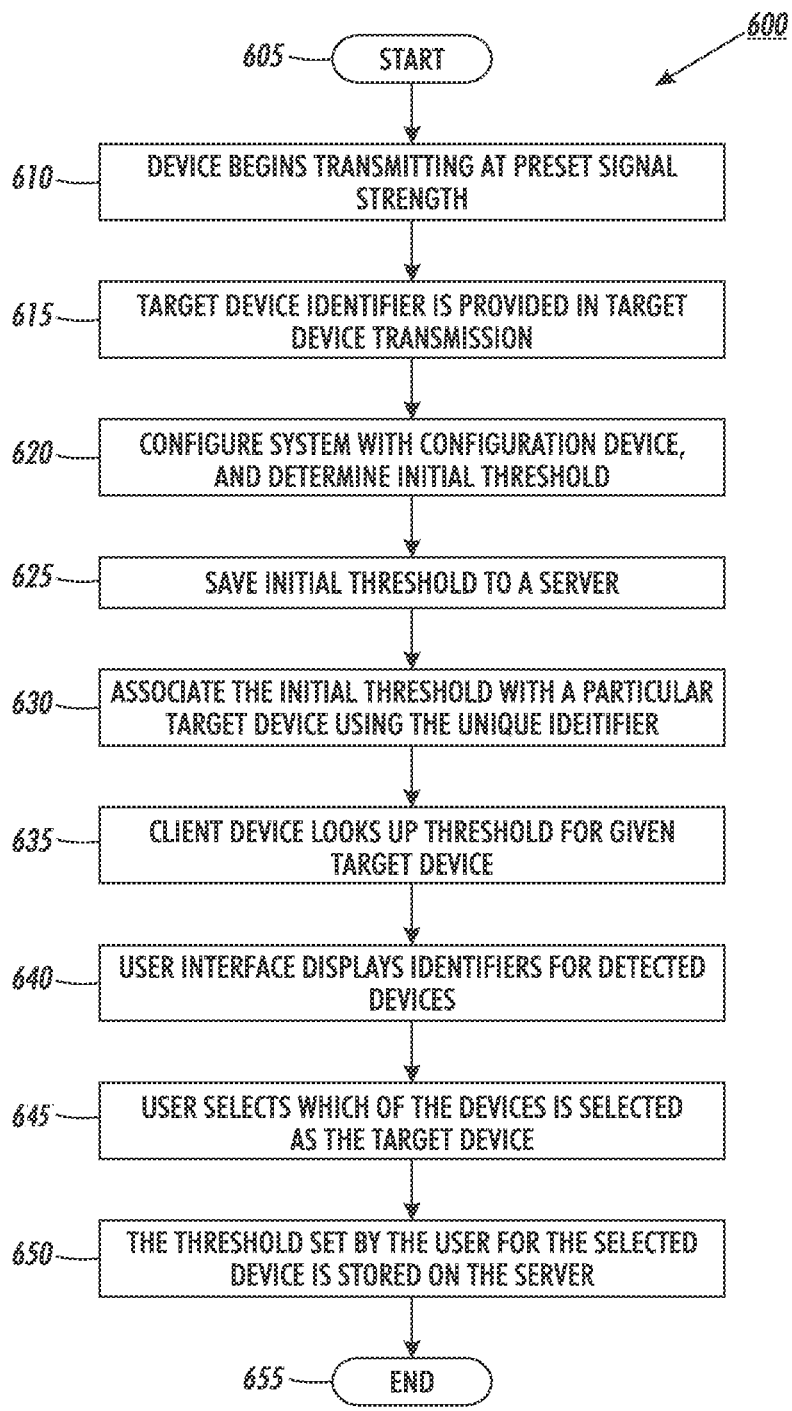
FIG. 6 depicts a flow chart of logical operational steps associated with a method for pairing a target device and a client device in accordance with an embodiment of the invention.

FIG. 6 illustrates a method 600 associated with an embodiment wherein a varying threshold can be established for each target/client deployment. In this embodiment, the threshold is varied according to the target devices and client devices involved via an initial configuration and/or the continued use of the system. The threshold is adaptive because it is altered to adjust to the continued use of the system and/or the given deployment. The method begins at step 605.

At step 610, the plurality of devices 405 A-C are configured to start transmitting at a particular signal strength, via a powered tag 425 or its built-in hardware 426. The choice of the signal strength used may vary depending on the particular environment in which the devices 405 A-C are deployed and the associated interference characteristics of the environment.

The target device can also be initialized with a human-friendly identifier 427, such as a name or a color, which is included in the target devices' transmissions or broadcasts as shown at step 615. This human-friendly name can be chosen to be recognizable by a user. The unique human-friendly name can be attached to its respective device 405 or can be provided near the target device 405 as a sticker with the chosen name or color, or some similar scheme.

The system is configured using a configuration device 415 as shown at step 620. This may be, for example, a Smartphone or other such device running a configuration application. Configuration at step 620 may include establishing the threshold required for pairing the target device 405 and client device 410 according to the degree of physical proximity between the respective devices. This may be deployment-specific. For example, if the necessary proximity for proper pairing is empirically determined to be direct or near-direct physical contact (calibrated, for example, in millimeters), then a signal strength threshold is chosen to match the signal strength detected by the configuration device 415 at that distance.

Next at step 625, the selected initial threshold is written to a server, such as server 206. This step may include accessing and storing the initial threshold on a memory device such as storage 208 associated with network 202 and server 206. The threshold can be associated with a particular target device 405 that is being configured, using the unique identifier 427 transmitted by the target device 405 as shown by step 630. This same process can be repeated for each of devices 405 A-C either in parallel or individually when the given device 405 is selected as the target device.

Client devices 410 A-C may then lookup the threshold stored on the server for the device 405 selected as the target device, as illustrated at step 635. Client devices' access to the server may be protected using any one of many known network security methods.

When a client device 410 detects a broadcast from a target device 405 with, for example, a given GUID, it looks up the initially configured threshold for that GUID on the server. The client device may also supply model information for the client hardware. The threshold may not be correctly tuned to the client hardware and may be too strong or too weak for the particular client device 410 due to variance in the client hardware and form factor as it interacts with the deployment environment. As a result, the client device 410 may either fail to connect to the target device 405, connect too promiscuously, or properly connect.

The client can provide the user with a user interface that can be used to override the stored threshold for given GUIDs that it can currently detect. It should be appreciated that multiple devices 405 may be concurrently visible. At step 640, the human-friendly identifier associated with the device 405 can be displayed to the user to allow the user to distinguish between the devices 405 A-C using a user interface associated with the client device 410. The user can choose which target to pair with according to the information presented in the user interface as shown at step 645. At step 650, the threshold selected by the user is stored on the server, along with model information for the client device 410 and the target device GUID.

The information stored on the server can be provided in response to subsequent lookups. In this way, the threshold value is dynamically adjusted and delivers more accurate results for particular model hardware in the given deployment scenario where the target GUID is found. The method ends at step 655.

Figure 7:
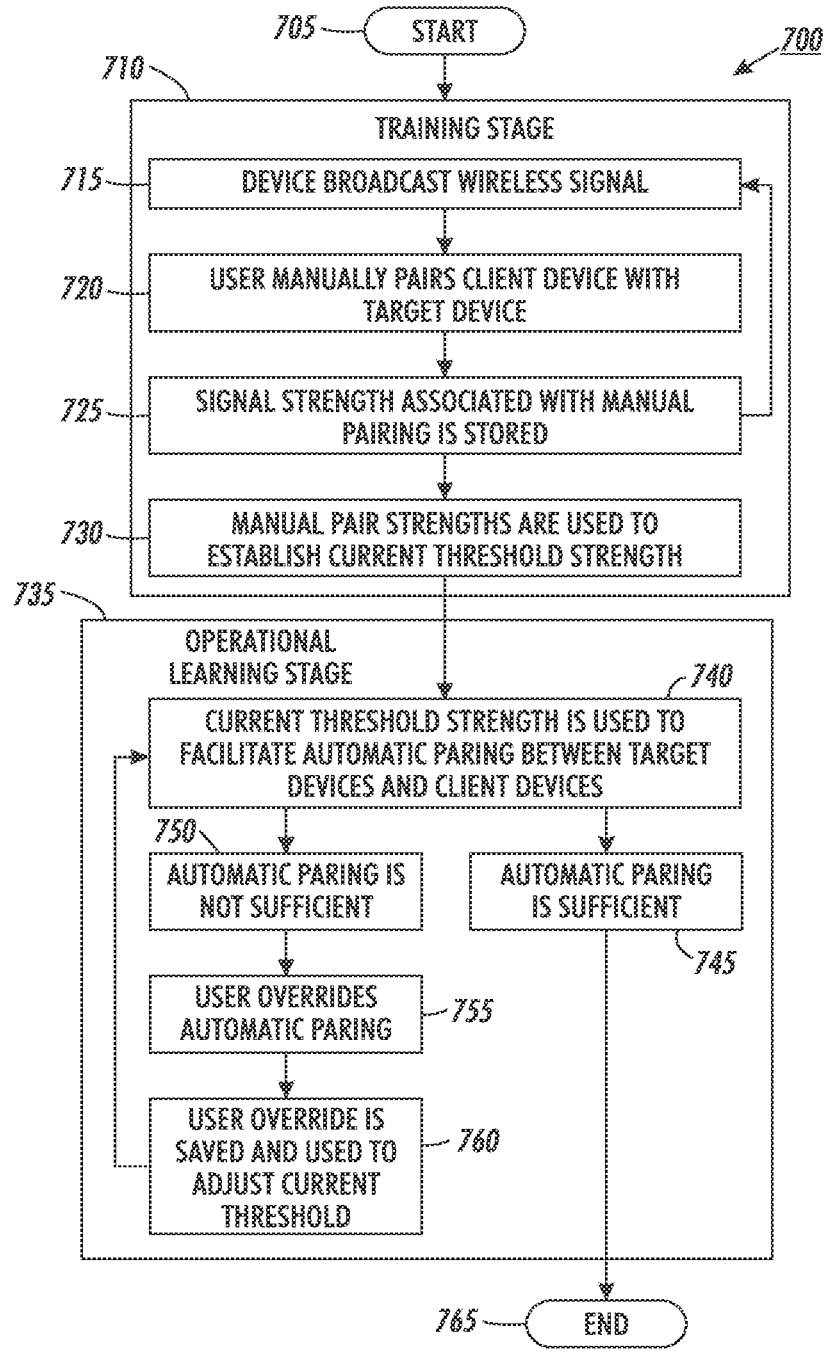
FIG. 7 depicts a flow chart of logical operational steps associated with a two staged method for pairing a target device and a client device in accordance with an embodiment of the invention.

Logical operational steps associated with a method 700 in accordance with another embodiment are illustrated in FIG. 7. It should be understood that the steps shown in FIG. 5 and FIG. 6 may be, additionally or alternatively, used in the method shown in FIG. 7. This method begins at step 705.

Step 710 illustrates a training phase wherein a number a sub-steps are used to establish an initial or current signal strength necessary for pairing with one or more target devices. In the training phase 710, the target devices broadcast wireless signals, as shown at step 715. Client devices can then be paired with target devices as illustrated at step 720. The user of the client device manually pairs the client device and target device. The manual pairing allows the user to experiment with the distance between the target device and client device in order to find an appropriate threshold signal strength. Once the user identifies a threshold signal strength manually, that signal strength can be stored on any or all of a server, the client device or the target device as shown at step 725. Steps 715-725 can be repeated by one or many users of the target device. In this way, the necessary signal strength for pairing a target and client device can be established. Thus, at step 730, the manual pairing strength data can be used to establish a current or initial threshold signal strength necessary for proper pairing.

The method then moves to an operational learning stage 735. In this stage the current or initial threshold signal strength identified in the training stage 710 is used to facilitate automatic pairing between target devices and client devices as shown at step 740. If the target device and client device pair, then the pairing threshold is sufficient as described by step 745. However, if the devices do not properly pair at step 750, the user can override the automatic pairing threshold and can select a new threshold wherein the target and client devices properly pair as illustrated by step 755. The threshold signal strength manually selected via user override can be stored on any or all of a server, the client device, or the target device, as shown at step 760. The signal strength manually selected via the user override can then be used to adjust the current threshold signal strength. Thus, the current threshold signal strength can be automatically adjusted until the automatic pairing is again sufficient shown by step 745, at which point the method ends at step 765.

The method illustrated in FIG. 7 thus provides a two staged approach to pairing target devices and client devices. The training stage pairing is manual. The training stage can be used to establish signal strengths as the system is used. In the operational learning stage, thresholds are known well-enough for automatic pairing with occasional correction by users who override the automatic pairing by manually pairing. These overrides provide continuous learning data.

The method shown in FIG. 7 can be thought of as a continuum from 100% manual during the training stage to (for example) 98% automatic pairing and 2% manual paring after many iterations in the operational learning stage. Method 700 may be combined with the administrative setup steps where initial thresholds are chosen in FIG. 5 and FIG. 6. However, method 700 may be advantageous because the system does not require explicit administration.

It should be understood that the model information associated with given device 410 can be used to affect the threshold choice flexibly. This may involve further steps. For example, inferences across similar or related client models can be drawn to provide better predictions for client hardware not previously stored in the server. Such inferences may be driven by preconfigured rules or use statistical learning techniques, or some combination of both. Additional inferences may also be based on the battery strength of battery-operated tags on devices 405 A-C, where the battery strength, which declines over time, is used to moderate the required threshold strength as the battery strength decreases. Thus, the method adaptively adjusts threshold values to provide better user experience across a heterogeneous mixture of targets, clients, and deployment scenarios.

Embodiments of the invention may also include alternatives and/or extensions. For example, in one such embodiment, the threshold may be written to the target device 405 during the initialization of the device. The device can then broadcast the threshold in its transmission, which can be received by client devices 410. The client device can then use the broadcast threshold to determine if the signal strength is sufficient to facilitate pairing between the client device and the target device. Although this embodiment is less flexible, it also does not require a server and may be deployed in environments where no server is available. Customization in this embodiment is limited to the target in its present deployment environment.

In another example, a deployment may contain multiple target devices 405 A-C (it should be understood there may be any number of target devices 405) of which many may be simultaneously visible to client devices 410 A-C. For example, in a given deployment scenario, one room of a multi-story building may have multiple MFDs. The walls in the environment may be sufficiently porous to render many target devices 405 A-C visible from various positions throughout the building. Instead of basing the pairing decision for a target device on just one threshold, the pairing decision may be based on the n-tuple (where n can be any number) of visible target devices 405 A-C and associated signal strengths.

Figure 8:
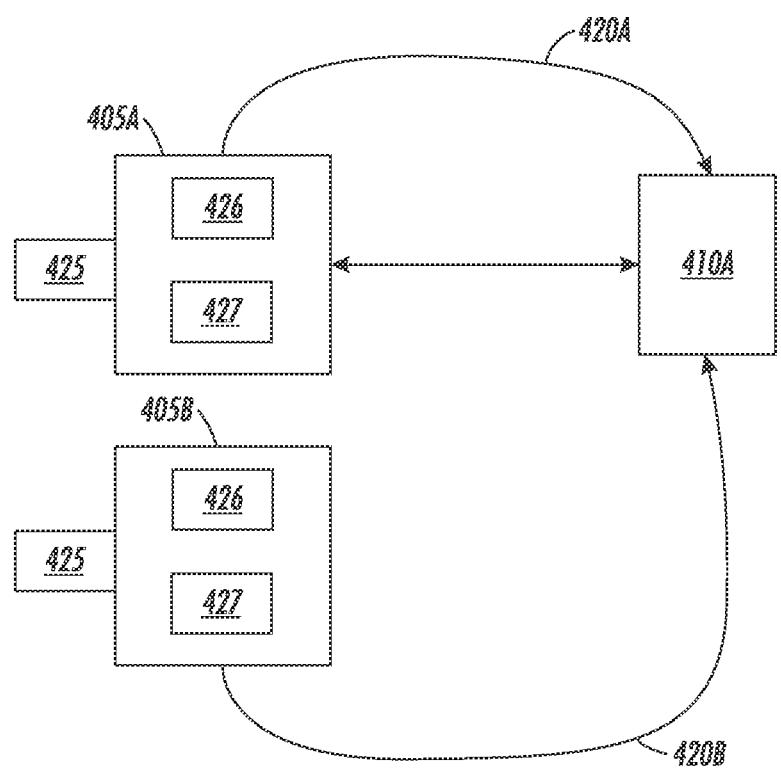
FIG. 8 depicts an exemplary alternative embodiment of a system for pairing a target device and a client device.

A simple case of this embodiment is illustrated in FIG. 8. In this example, there are two wirelessly visible target devices 405 A and 405 B. A client standing in front of target device 405 A with client device 410 A could receive two signals identified as signals 420 A and 420 B, with respective signal strengths alpha and beta. The pairing decision may be based on the pair of signal strengths (alpha, beta), with the rule that the signal 420 A from target device 405 A must be greater than alpha and the signal strength 420 B from target device 405 B must be less than beta. If this condition is met, pairing can occur between device 405 A and 410 A as shown.

The simple case illustrated in FIG. 8 can be extended to a case involving many devices 405. For example, a client device 410 A may be present in an environment with 12 signals of varying strengths. Client device 410A may be in front of device 405A and the user may desire to pair with device 405A. In this case, a vector of the twelve present signal strengths, as they are present at the location of client device 410A in front of device 405A, can be combined into a vector of signal strengths. The vector may be used as input to a statistical algorithm such as multinomial logistic regression algorithm. This embodiment has the advantage that all of the visible signals are taken into account.

Continuing with the example, device 405B may be next to device 405A and may provide a signal that is stronger than the signal from device 405A at the location of client device 410A in front of device 405A. The system described herein can be trained to evaluate the vector associated with the combination of the twelve signal strengths and nevertheless, initiate pairing with device 405A because that is what it has been trained to do, as described above.

More generally, a logistic regression model (or other known equivalent model) may be used to identify or predict the best target device 405 given the n-tuple of currently visible signal strengths. These signal strengths can be combined into a vector indicative of signal strengths. The statistical model may be trained adaptively during initial configuration of the target devices 405. The statistical model can then be used in conjunction with the methods illustrated in FIGS. 5-7 to facilitate pairing with client devices.

Based on the foregoing, it can be appreciated that a number of embodiments, preferred and alternative, are disclosed herein. For example, in one embodiment, a method for pairing devices comprises transmitting a plurality of communication signals from each of a plurality of devices and setting an initial threshold vector of signal strengths as a current threshold vector of signal strengths for at least one target device selected from among the plurality of devices. The embodiment includes pairing at least one client device with the at least one target device when a measured vector of signal strengths exceeds the current threshold vector of signal strengths and adjusting the current threshold vector of signal strengths according to the pairing between the client device and the target device, thereby, adaptively adjusting the current threshold vector of signal strengths.

In another embodiment setting, the initial threshold vector of signal strengths as the current threshold vector of signal strengths further comprises storing the current threshold vector of signal strengths in a memory associated with a server in communication with the target device and the client device. In addition, the embodiment includes providing a plurality of identifiers associated individually with each of the plurality of devices to the client device and the server via the plurality of communication signals, and associating the current threshold vector of signal strengths with the target device according to the identifier associated with the target device. The identifier associated with the target device comprises at least one of a Globally Unique Identifier, a human friendly identifier, and a locally assigned identifier.

In another embodiment, the method further comprises providing information associated with the client device to the server, establishing a device specific threshold vector of signal strengths according to the pairing between the client device and the target device, and saving the device specific threshold vector of signal strengths and information associated with the client device in the memory of the server as a current device specific threshold vector of signal strengths, wherein the current device specific threshold vector of signal strengths is provided as a current threshold vector of signal strengths for other client devices with similar model information.

In yet another embodiment, establishing a current device specific threshold vector of signal strengths further comprises a training stage wherein a current device specific threshold vector of signal strengths is set by manually setting the current device specific threshold vector of signal strength at least once, and an operational learning stage wherein the current device specific threshold vector of signal strengths is manually selected and adjusted only when automatic pairing between the at least one client device and the at least one target device is insufficient.

In another embodiment, establishing an initial threshold vector of signal strengths for the target device and setting the initial threshold vector of signal strengths as a current threshold vector of signal strengths for the target device further comprises measuring the communication signals from the target device and the plurality of devices with a configuration device. The embodiment includes determining a distance associated with a vector of signal strengths wherein the communication signal will support communication between the target device and the client device.

The method of setting the initial threshold vector of signal strengths as the current threshold vector of signal strengths further comprises storing the current threshold vector of signal strengths in a memory associated with the client device.

In another embodiment, a system comprises a plurality of devices configured for rendering media wherein the plurality of devices transmit a plurality of communication signals, a processor, and a computer-usable medium embodying computer code, the computer-usable medium being coupled to the processor, the computer code comprising non-transitory instruction media executable by the processor. The code is configured for setting an initial threshold vector of signal strengths as a current threshold vector of signal strengths for at least one target device selected from among the plurality of devices, pairing at least one client device with the at least one target device when a measured vector of signal strengths exceeds the current threshold vector of signal strengths, and adjusting the current threshold vector of signal strengths according to the pairing between the client device and the target device, thereby adaptively adjusting the current threshold vector of signal strengths.

Setting the initial threshold vector of signal strengths as the current threshold vector of signal strengths further comprises storing the current threshold vector of signal strengths in a memory associated with a server in communication with the target device and the client device. The computer code comprising non-transitory instruction media executable by the processor is further configured for providing a plurality of identifiers associated individually with each of the plurality of devices to the client device and the server via the plurality of communication signals, and associating the current threshold vector of signal strengths with the target device according to the identifier associated with the target device. The identifier associated with the target device comprises at least one of a Globally Unique Identifier, a human friendly identifier, and a locally assigned identifier.

In yet another embodiment, the computer code comprising non-transitory instruction media executable by the processor is further configured for providing information associated with the client device to the server, establishing a device specific threshold vector of signal strengths according to the pairing between the client device and the target device, and saving the device specific threshold vector of signal strengths and information associated with the client device in the memory of the server as a current device specific threshold vector of signal strengths, wherein the current device specific threshold vector of signal strengths is provided as a current threshold vector of signal strengths for other client devices with similar model information. Establishing a current device specific threshold vector of signal strengths further comprises setting the current device specific threshold vector of signal strengths via a user override.

In another embodiment, establishing an initial threshold vector of signal strengths for the target device and setting the initial threshold vector of signal strengths as a current threshold vector of signal strengths for the target device further comprises measuring the communication signal from the target device and the plurality of devices with a configuration device, and determining a distance associated with a vector of signal strengths wherein the communication signal will support communication between the target device and the client device.

In an embodiment, setting the initial threshold vector of signal strengths as the current threshold vector of signal strengths further comprises storing the current threshold vector of signal strengths in a memory associated with the client device.

In yet another embodiment, a system comprises at least one device wherein the at least one device comprises a communication module configured to transmit a communication signal from the at least one device, a threshold setting module configured to establish an initial threshold vector of signal strengths for the device and set the initial threshold vector of signal strengths as a current threshold vector of signal strengths for the device, a pairing module configured to pair the device to at least one client when a measured vector of signal strengths exceeds the current threshold vector of signal strengths, and a threshold adjusting module configured to adjust the current threshold vector of signal strengths according to the pairing between the client device and the target device, thereby adaptively adjusting the current threshold vector of signal strengths.

In another embodiment, the system further comprises a server and a memory associated with the server wherein the current threshold vector of signal strengths is stored in the memory associated with the server. At least one identifier is associated with the device, wherein the identifier is provided to the client device and the server via the communication signals in order to associate the current threshold vector of signal strengths with the device according to the identifier associated with the device.

In another embodiment, the pairing module is further configured for providing information associated with the client device to the server, establishing a device specific threshold vector of signal strengths according to the pairing between the client device and the target device, and saving the device specific threshold vector of signal strengths and information associated with the client device in the memory of the server as a current device specific threshold vector of signal strengths, wherein the current device specific threshold vector of signal strengths is provided as a current threshold vector of signal strengths for other client devices with similar model information.

It will be appreciated that variations of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art, which are also intended to be encompassed by the following claims.

What is claimed is:

1. A method for pairing devices, said method comprising:
   transmitting a plurality of communication signals from each of a plurality of devices;
   setting an initial threshold vector of signal strengths comprising a signal strength required for pairing as a current threshold vector of signal strengths required for pairing at least one target device selected from among said plurality of devices;
   pairing at least one client device with said at least one target device when a measured vector of signal strengths exceeds said current threshold vector of signal strengths;
   adjusting said current threshold vector of signal strengths according to a pairing quality between said at least one client device and said at least one target device, thereby adaptively adjusting said current threshold vector of signal strengths; and
   physically rendering data transferred to said target device via said pairing.

2. The method of claim 1 wherein setting said initial threshold vector of signal strengths as said current threshold vector of signal strengths further comprises:
   storing said current threshold vector of signal strengths in a memory associated with a server in communication with said at least one target device and said at least one client device.

3. The method of claim 2 further comprising:
   providing a plurality of identifiers associated individually with each of said plurality of devices to said at least one client device and said server via said plurality of communication signals; and
   associating said current threshold vector of signal strengths with said at least one target device according to said identifier associated with said at least one target device.

4. The method of claim 3 wherein said identifier associated with said at least one target device comprises at least one of:
   a Globally Unique Identifier; and
   a human friendly identifier.

5. The method of claim 2 further comprising:
   providing information associated with said at least one client device to said server said information comprising a model and client hardware information;
   establishing a device specific threshold vector of signal strengths according to said pairing between said at least one client device and said at least one target device; and
   saving said device specific threshold vector of signal strengths and information associated with said at least one client device in said memory of said server as a current device specific threshold vector of signal strengths, wherein said current device specific threshold vector of signal strengths is provided as a current threshold vector of signal strengths for other client devices with similar model information.

6. The method of claim 1 wherein establishing a current device specific threshold vector of signal strengths further comprises:
   a training stage wherein a current device specific threshold vector of signal strengths is set by manually setting said current device specific threshold vector of signal strength at least once; and
   an operational learning stage wherein said current device specific threshold vector of signal strengths is manually selected and adjusted only when automatic pairing between said at least one client device and said at least one target device is insufficient.

7. The method of claim 1 wherein establishing an initial threshold vector of signal strengths for said at least one target device and setting said initial threshold vector of signal strengths as a current threshold vector of signal strengths for said at least one target device further comprises:
   measuring said communication signals from said at least one target device and said plurality of devices with a configuration device; and
   determining a distance associated with a vector of signal strengths wherein said communication signal will support communication between said at least one target device and said at least one client device.

8. The method of claim 1 wherein setting said initial threshold vector of signal strengths as said current threshold vector of signal strengths further comprises:
   storing said current threshold vector of signal strengths in a memory associated with said at least one client device.

9. A system, comprising:
   a plurality of devices comprising multifunction devices configured for rendering media wherein said plurality of devices transmit a plurality of communication signals;
   a processor; and
   a computer-usable medium embodying computer code, said computer-usable medium being coupled to said processor, said computer code comprising non-transitory instruction media executable by said processor configured for:

setting an initial threshold vector of signal strengths comprising a signal strength required for pairing as a current threshold vector of signal strengths required for pairing at least one target device selected from among said plurality of devices;

pairing at least one client device with said at least one target device when a measured vector of signal strengths exceeds said current threshold vector of signal strengths;

adjusting said current threshold vector of signal strengths according to a pairing quality between said at least one client device and said at least one target device, thereby adaptively adjusting said current threshold vector of signal strengths; and rendering data transferred to said target device via said pairing.

10. The system of claim 9 wherein setting said initial threshold vector of signal strengths as said current threshold vector of signal strengths further comprises:

storing said current threshold vector of signal strengths in a memory associated with a server in communication with said at least one target device and said at least one client device.

11. The system of claim 10 wherein said computer code comprising non-transitory instruction media executable by said processor is further configured for:

providing a plurality of identifiers associated individually with each of said plurality of devices to said at least one client device and said server via said plurality of communication signals; and associating said current threshold vector of signal strengths with said at least one target device according to said identifier associated with said at least one target device.

12. The system of claim 11 wherein said identifier associated with said at least one target device comprises at least one of:

a Globally Unique Identifier; and
a human friendly identifier.

13. The system of claim 10 wherein said computer code comprising non-transitory instruction media executable by said processor is further configured for:

providing information associated with said at least one client device to said server said information comprising a model and client hardware information;

establishing a device specific threshold vector of signal strengths according to said pairing between said at least one client device and said at least one target device; and saving said device specific threshold vector of signal strengths and information associated with said at least one client device in said memory of said server as a current device specific threshold vector of signal strengths, wherein said current device specific threshold vector of signal strengths is provided as a current threshold vector of signal strengths for other client devices with similar model information.

14. The system of claim 13 wherein establishing a current device specific threshold vector of signal strengths further comprises:

setting said current device specific threshold vector of signal strengths via a user override.

15. The system of claim 9 wherein establishing an initial threshold vector of signal strengths for said at least one target device and setting said initial threshold vector of signal strengths as a current threshold vector of signal strengths for said at least one target device further comprises:

measuring said communication signal from said at least one target device and said plurality of devices with a configuration device; and determining a distance associated with a vector of signal strengths wherein said communication signal will support communication between said at least one target device and said at least one client device.

16. The system of claim 9 wherein setting said initial threshold vector of signal strengths as said current threshold vector of signal strengths further comprises:

storing said current threshold vector of signal strengths in a memory associated with said at least one client device.

17. A system, comprising:

at least one device wherein said at least one device comprises:

a communication module configured to transmit a communication signal from the at least one device;

a threshold setting module configured to establish an initial threshold vector of signal strengths comprising a signal strength required for pairing for said at least one device and set said initial threshold vector of signal strengths as a current threshold vector of signal strengths required for pairing said at least one device;

a pairing module configured to pair said at least one device to at least one client when a measured vector of signal strengths exceeds said current threshold vector of signal strengths;

a threshold adjusting module configured to adjust said current threshold vector of signal strengths according to a pairing quality between said at least one client and said at least one device, thereby adaptively adjusting said current threshold vector of signal strength; and rendering data transferred to said at least one device via said pairing.

18. The system of claim 17 further comprising:

a server; and
a memory associated with said server wherein said current threshold vector of signal strengths is stored in said memory associated with said server.

19. The system of claim 18 further comprising:

at least one identifier associated with said at least one device wherein said identifier is provided to said at least one client and said server via said communication signals in order to associate said current threshold vector of signal strengths with said at least one device according to said identifier associated with said at least one device.

20. The system of claim 19 wherein said pairing module is further configured for:

providing information associated with said at least one client to said server said information comprising a model and client hardware information;

establishing a device specific threshold vector of signal strengths according to said pairing between said at least one client and said at least one device; and saving said device specific threshold vector of signal strengths and information associated with said at least one client in said memory of said server as a current device specific threshold vector of signal strengths, wherein said current device specific threshold vector of signal strengths is provided as a current threshold vector of signal strengths for other client devices with similar model information.

* * * * *